United States Patent [19]
Irie et al.

[11] Patent Number: 5,959,028
[45] Date of Patent: Sep. 28, 1999

[54] CURABLE RESIN COMPOSITION FOR COATING USE

[75] Inventors: Takashi Irie, Suita; Kei Aoki, Ikoma, both of Japan

[73] Assignee: Nippon Paint Co., Ltd., Japan

[21] Appl. No.: 08/859,912

[22] Filed: May 21, 1997

[30] Foreign Application Priority Data

May 22, 1996 [JP] Japan ................................ 8-151546

[51] Int. Cl.$^6$ ........................................ C08L 33/14
[52] U.S. Cl. ..................... 525/10; 525/259; 525/445; 525/446
[58] Field of Search .................. 525/10, 445, 446, 525/259

[56] References Cited

U.S. PATENT DOCUMENTS 4,408,018  10/1983  Bartman et al. .
4,602,061   7/1986  Akkerman ............................. 525/10
5,219,958   6/1993  Noomen et al. ....................... 525/10
5,496,896   3/1996  Alfons ................................. 525/74
5,565,525  10/1996  Morimoto et al. .................... 525/259

FOREIGN PATENT DOCUMENTS 0 413 290  2/1991  European Pat. Off. .

*Primary Examiner*—Jeffrey C. Mullis
*Attorney, Agent, or Firm*—Millen, White, Zelano, & Branigan, P.C.

[57] ABSTRACT

A resin composition curable through a Michael reaction between (a) a component having a plurality of α,β-unsaturate carbonyl groups and (b) a component having a plurality of activated methylene group in the presence of a catalyst is disclosed. The activated methylene component is a polymer of an asymmetric malonate ester in which one of carboxyl groups is esterified with an alkanol while the other carboxyl group is esterified with hydroxyalkyl (meth) acrylate or polyoxyalkylene glycol mono(meth)acrylate.

15 Claims, No Drawings

5,959,028

CURABLE RESIN COMPOSITION FOR COATING USE

FIELD OF THE INVENTION

This invention relates to a curable resin composition for coating use. More paticularly, it relates to a resinous composition which cures through a Michael reaction.

BACKGROUND OF THE INVENTION

Michael reactions in which base-catalysed addition of activated methylene to polarized double bond are utilized in the crosslinking of resinous compositions for coating use. Theses compositions are advantageous in that the Michael reaction gives a chemically stable crosslinking bond without forming any reaction by-product.

Typical examples of prior art include the following patent literature:

U.S. Pat. No. 4,408,018;
U.S. Pat. No. 4,602,061;
U.S. Pat. No. 5,017,649;
U.S. Pat. No. 5,084,536;
EP-A-0448154;
JP-A-01/121341 (EP-A-0310011); and
JP-A-01/204919 (EP-A-0326723).

Typical examples of activated methylene compounds used in the Michael reaction are derivatives of acetoacetic acid, cyanoacetic acid and malonic acid. For use in the crosslinking reaction of resins or polymers, the Michael donor must be a compound or polymer having a plurality of activated methylene groups in the molecule. Acrylic monomers having an acetoacetoxy group can be synthesized relatively easily by reacting diketene with a hydroxylalkyl acrylate or methacrylate such as 2-hydroxyethyl acrylate (HEA) or 2-hydroxylethyl methacrylate (HEMA). Activated methylene-containing acrylic polymers used in the prior art are either polymers of acetoacetylated hydroxyalkyl (meth) acrylate monomers or acetoacetylated acrylic polyols produced by reacting diketene with an acrylic polyol polymer.

Because malonic acid is a dibasic acid, malonate groups can be incorporated into a polyester chain to produce a polymeric Michael donor. U.S. Pat. No. 4,602,061 discloses a liquid two-component coating composition comprising (a) an oligomeric or polymeric malonate compound such as polyurethanes, polyesters, polyacrylates, epoxy resins, polyamids or polyvinyl resins containing malonate groups, either in the main chain or the side chain or in both, (b) an α, β-ethylenically unsaturated carbonyl compound and (c) a basic catalyst.

The malonate group-containing polyacrylate resin disclosed therein is a reaction products of the above-mentioned malonate polyester resin first with a diisocyanate and then with HEA or HEMA.

JP-A-03206012 discloses a malonate group-containing acrylic monomer and polymers thereof for use as odorless, low irritating and low water absorbing dental materials. Corresponding acrylate monomers and polymers containing higher homologs such as succinate or adipate are also disclosed. The use of these monomers and polymers in combination with a Michael acceptor and a catalyst are not disclosed therein.

It has been discovered that resinous compositions containing a malonate group-containing acrylate polymer, a Michael acceptor and a catalyst are advantageous in terms of weatherability over corresponding compositions containing an acetoacetate group-containing acrylate polymer when used for coating purposes.

SUMMARY OF THE INVENTION

According to the present invention, a curable resin composition having enhanced weatherability is provided by using as an activated methylene component a malonate group-containing acrylate polymer in place of an acetoacetate group-containing acrylate polymer.

Accordingly, the present invention provides a curable resin composition comprising:

(a) a component containing a plurality of α,β-ethylenically unsaturated carbonyl groups in the molecule;

(b) an acryalte polymer containing a plurality of malonate-terminated pendant groups in the molecule; and (c) a catalyst capable of promoting the Michael reaction.

The present invention also provides a coating composition containing the above resin composition as a vehicle resin.

DESCRIPTION OF THE PREFERRED EMBODIMENTS

Component (a)

Component (a) is a compound or polymer having a plurality of ethylenic unsaturations between carbon atoms at the α and β positions relative to a carbonyl group. Typical examples of such compound are acrylic or methacrylic (hereinafter collectively referred to as "(meth) acrylic") esters of polyhydric alcohols such as ethylene glycol di(meth)acrylate, diethylene glycol di(meth) acrylate, propylene glycol di(meth)acrylate, neopentyl glycol di(meth) acrylate, trimethylolpropane tri(meth) acrylate, glycerol tri (meth)acrylate, pentaerythritol tetra(meth)acrylate and the like.

Unsaturated polyesters containing an unsaturated dicarboxylic acid such as maleic or fumaric acid may also be used as component (a). Unsaturated polyesters are used in large quantities for molding various FRP products and may be synthesized, as is well-known, by the polycondensation reaction between an α,β-unsaturated dicarboxylic acid component such as maleic anhydride or fumaric acid optionally containing other polycarboxylic acids such as phthalic anhydride, isophthalic, terephthalic, adipic, sebacic or trimellitic acid and a polyol component such as ethylene glycol, diethylene glycol, propylene glycol, tetramethylene glycol, 1,6-hexanediol, neopentyl glycol, trimethylolpropane, glycerine or pentaerythritol.

Other examples of component (a) include epoxy acrylate resins produced by reacting (meth)acrylic acid with an epoxy resin such as bisphenol or novolac type epoxy resins, and urethane acrylate resins produced by reacting a hydroxyl group-containing acrylic resin first with an organic polyisocyanate such as isophoronediisocyanate, tolylenediisocyanate, diphenylmethanediisocyanate, hexamethylenediisocyanate or a urethane prepolymer thereof and then with 2-hydroxyethyl (meth)acrylate.

Acrylic resins containing a plurality of α,β-unsaturated carbonyl functions may be produced via the ring-opening reaction of an epoxy ring with (meth)acrylic acid or the acylation of a hydroxyl group with (meth)acrylic acid. For example, epoxy group-containing acrylic resins may be produced by copolymerizing an epoxy group-containing acrylic monomer such as glycidyl (meth)acrylate with an acrylic monomer free of the epoxy group and/or a nonacrylic ethylenically unsaturated monomer. Examples of copolymerizable acrylic monomers include alkyl (meth) acrylates such as methyl, ethyl, propy, n-butyl, isobutyl, t-butyl, 2-ethylhexyl or lauryl (meth)acrylate; hydroxyalkyl (meth) acrylates such as 2-hydroxyethyl (meth) acrylate; aryl or aralkyl (meth)acrylates such as phenyl or benzyl (meth) acrylate; PLACCEL FA1 or FM1 (adduct of 2-hydroxyethyl (meth)acrylate with polycaprolactone sold by Daicel Chemical Industries, Ltd.); and other acrylic monomers such as acrylamide, methylene-bis-acrylamide or acrylonitrile. Examples of copolymerizable non-acrylic monomers include styrene, α-methylstyrene, itaconic acid, maleic acid, vinyl acetate and the like. The epoxide function of the acrylic copolymer may then be opened with (meth)acrylic acid to introduce the α,β-unsaturated carbonyl function. Conversely, an epoxy group-containing acrylic monomer such as glycidyl (meth)acrylate may be reacted with an acrylic polymer containing a plurality of free carboxylic functions which may be produced by copolymerizing a carboxyl group-containing monomer such as acrylic, methacrylic or itaconic acid with a copolymerizable acrylic monomer and optionally with a non-acrylic monomer as discussed supra.

Acryl polyols containing a plurality of hydroxyl groups may be modified to have a plurality of α,β-unsaturated carbonyl functions by the acylation reaction with acrylic or methacrylic acid or a reactive derivative thereof such as chloride, or the transesterification reaction with a lower alkyl (meth)acrylate such as methyl (meth)acrylate. Acryl polyols may be produced by copolymerizing a hydroxyl group-containing acrylic monomer such as 2-hydroxyethyl (meth) acrylate, 2-hydroxypropyl (meth)acrylate, 4-hydroxybutyl (meth)acrylate or PLACCEL FM-1 with a copolymerizable acrylic and/or non-acrylic monomer as discussed supra.

Further examples of component (a) include polyether acrylate resins such as polyethylene glycol di(meth) acrylate, silicone oligoners such as 3-methacryloyloxypropyl-terminated polydiorganosiloxanes and fluororesins containing α,β-unsaturated carbonyl groups.

When component (a) is a resin, its molecular weight ranges between 400 and 100,000, preferably between 600 and 10,000, and the alkenyl equivalent weight ranges between 100 and 10,000, preferably between 100 and 1,000. The term "equivalent weight" as used herein refers to the molecular weight divided by the number of a function concerned.

Component (b)

Component (b) may be produced by copolymerizing a malonate-terminated acrylate monomer with a copolymerizable acrylic and/or non-acrylic monomer as exemplified in connection with Component (a).

Usable malonate-terminated acrylate monomers include but are not limited to the acrylate monomer disclosed in JP-A-03206012 cited supra. The malonate-terminated acrylate monomers have the formula:

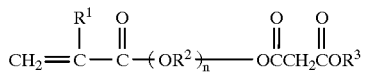

wherein $R^1$ is hydrogen or methyl, $R^2$ is a $C_2$–$C_6$-alkylene, $R^3$ is a $C_1$–$C_6$ alkyl and n is an integer from 1 to 10.

A first class of preferred monomers are monomers of the above formula wherein $R^2$ is —$CH_2CH_2$—, n is 1 and $R^3$ is a $C_1$–$C_6$ alkyl. These monomers are produced by the transesterification reaction of dialkyl malonate with HEA or HEMA.

A further class of preferred monomers are produced by transesterifying dialkyl malonate with a polyoxyalkylene glycol monoacrylate or methacrylate. Monomers of this class are represend by the above formula wherein $R^2$ is —$CH_2CH_2$—, —$CH(CH_3)CH_2$— or —$(CH_2)_4$—, n is an integer of greater than 1, and $R^3$ is a $C_1$–$C_6$ alkyl.

Examples of copolymerizable acrylic monomers include alkyl (meth)acrylates such as methyl, ethyl, propy, n-butyl, isobutyl, t-butyl, 2-ethylhexyl or lauryl (meth)acrylate; hydroxyalkyl (meth)acrylates such as 2-hydroxyethyl (meth) acrylate; aryl or aralkyl (meth)acrylates such as phenyl or benzyl (meth)acrylate; and other acrylic monomers such as acrylamide, methylene-bis-acrylamide or acrylonitrile. Examples of copolymerizable non-acrylic monomers include styrene, α-methylstyrene, itaconic acid, maleic acid, vinyl acetate and the like.

Component (b), namely acrylate polymers having a plurality of malonate-terminated pendant groups preferably have a number average molecular weight from 1,000 to 50,000, more preferably from 1,000 to 10,000, and an activated methylene equivalent weight from 100 to 10,000, more preferably from 150 to 5,000.

Component (c)

As is well known, the Michael reaction normally requires the presence of a strong base to strengthen the acidity of methylene proton by the conversion of adjacent carbonyl group to a enolate anion.

Component (c) of the resin composition of the present invention may be a strong base. Examples thereof include alkali metal hydroxide such as sodium hydroxide or potassium hydroxide; alkal metal alkoxide such as sodium methoxide or potassium ethoxide; quaternary ammonium hydroxides such as tetrabutylammonium hydroxide or benzyltrimethylammonium hydroxide; quaternary ammonium carbonates such as tetrabutylammonium carbonate or benzyltrimethylammonium carbonate; tertiary amines such as diazabicyclooctane otherwise named DABCO; quanidines and amidines such as tetramethylquanidine, 1,8-diazabicyclo[5.4.0]undecene-7 or diazabicyclo[4.3.0] nonene-5; tertiary phosphines such as triphenylphosphine; and a mixture thereof. Quaternary ammonium fluorides and tetrahydroborates such as tetrabutylammonium fluoride or benzyltrimethylammonium fluoride or corresponding tetrahydroborates exhibit a catalytic activity by themselves in the Michael reaction as same as the above-mentioned strong bases.

Becasue strong bases and quaternary ammonium fluorides or tetrahydroborates are capable of catalyzing the Michael reaction even at room temperature, they cannot be incorporated into a storage stable, one-component curable resin composition. When such a one-component composition is desired, the strong base may be blocked with a carboxylic acid which undergoes volatilization or decarboxylation under baking conditions. Storage stable, one-component compositions may also be formulated by the use of a combination of an onium salt having no or little catalytic activity and an epoxy compound. The epoxy compound may be added to the composition as a discreate component or it may be covalently attached to either Component (a) or Component (b). This catalyst system is disclosed in commonly assigned U.S. Pat. No. 5,565,525 of which disclosure is incorporate herein by reference.

A variety of ammonium salts may be used. However, tetraalkyl and trialkylaralkyl type ammonium salts are preferred for economical reasons. Nitrogen-containing heterocyclic ammoniums salts such as those derived from pyridine, piperidine, piperazine or morpholine may also be used. Specific examples of ammonium cations include tetrabutylammonium, tetramethylammonium, tetraethylammonium, trimethylbenzylammonium, tetrapropylammonium, tetrahexylammonium, tetraoctylammonium, tetradecylammonium, tetrahexadecylammonium, triethylhexylammonium, 2-hydroxyethyltrimethylammonium (choline), methyltrioctylammonium, cetyltrimethylammonium, 2-chloroethyltrimethylammonium and methylpyridinium.

Counter anions are selected to form a non-basic stable salt with the ammonium cations and include halides other than fluoride, carboxylates, sulfonates, nitrate, sulfate, sulfite, phosphate and the like. Specific examples thereof include acetate, laurate, glycolate, benzoate, salicylate, maleate, phthalate, chloride, bromide, iodide, methanesulfonate, p-toluenesulfonate, dodecylbenzene sulfonate, triflate, nitrate, sulfate, methosulfate, phosphate and acid t-dibutylphosphate. Quaternary phosphonium salts such as tetrabutylphosphonium bromide and tertiary sulfonium salts such as trimethylsulfonium iodide may also be used.

Onium salts, among others, having counter anions derived from phenol carboxylic acids such as salicylic acid, polybasic carboxylic acid such as oxalic, maleic, fumaric or phthalic acid, nitric acid, phosphoric acid, sulfurous acid, phosphate ester or sulfonic acid exhibit a catalytic activity only in the presence of an epoxy component under the conventional baking condition. Accordingly, they are useful when a thermosetting, storage stable, one-component composition is desired.

In certain applications where the curable composition of the present invention is applied onto a pigmented base coat wet-on-wet and baked simultaneously with the base coat as in car body finishing, the catalyst can diffuse into the base coat layer so that the composition is not fully cured. Accordingly, it is advantageous to immobilize the catalyst in component (a) or component (b). This may be accomplished by the use of ammonium salts having a functional group capable of linking to component (a) or component (b). When component (a) or component (b) has a free carboxyl group, glycidyl group-containing ammonium salts such as glycidyltrimethylammonium chloride or bromide will react with the carboxyl group to form a covalent linkage. Such an ammonium salt may be added as a discrete component or as a conjugate with component (a) or component (b). Quatanary ammonium salts having acryloyl or methacryloyl group such as 2-(methacryloyloxy)-ethyltrimethylammonium chloride or bromide may also be used for this purpose. These ammonium monomers may be copolymerized with other monomers when producing component (a) or component (b). When added as a discrete component to the resin composition, they react with component (a) as a Michael donor.

When used as a discrete component, preferred examples of epoxy compounds include glycidyl ethers such as phenyl glycidyl ether, bisphenol epoxy resins, reaction products of epichlorohydrine with a polyhydric alcohol such as ethylene glycol or trimethylolpropane; glycidyl esters such as glycidyl benzoate, glycidyl (meth)acrylate or its polymers; alicyclic epoxides such as 4-(3,4-epoxycyclohexyl) methoxycarbonyl-1,2-cyclohexane, 3,4-epoxycyclohexylmethyl (meth)acrylate or its polymers; and α-olefine epoxides such as epoxyhexadecane.

When the epoxy compound is a resin, its molecular weight ranges between 400 and 100,000, preferably between 400 and 10,000, and the epoxy equivalent weight ranges between 200 and 100,000, preferably between 200 and 5,000.

The epoxy compound may be attached to component (a) or (b) through a covalent bond. This may conveniently be performed by reacting acrylic or methacrylic acid in an amount less than a stoichiometirc ratio with an epoxy resin or an epoxy group-containing acrylic resin to produce component (a) having remaining epoxy groups. Component (b) having epoxy groups covalently attached thereto may conveniently be produced by copolymerizing an epoxy group-containing monomer such as glycidyl (meth)acrylate, β-methylglycidyl (meth)acrylate or 3,4-epoxycyclohexylmethyl (meth)acrylate.

Curable resin compositions

The proportions of component (a) and component (b) in the curable resin composition of the present invention generally lie between 2:1 and 1:2, preferably between 1.5:1 and 1:1.5 relative to the double bond and the activated methylene to be added thereto. The proportion of component (c) may range generally between 0.1 and 10.0 equivalent %, preferably between 0.2 and 5.0 equivalent % based on the sum of component (a) and component (b).

All of components (a), (b) and (c) are dissolved or dispersed in an organic solvent conventionally used in the coating industry. Examples thereof include aliphatic hydrocarbons such as hexane or heptane; aromatic hydrocarbons such as toluene or xylene; petroleum fractions having a suitable boiling point range; esters such as butyl acetate, ethylene glycol diacetate or 2-ethylhexyl acetate; ketones such as acetone, methyl ethyl ketone (MEK), methyl isobutyl ketone (MIBK) or cyclohexanone; ethers such as tetrahydrofuran, ethylene glycol dimethyl ether, ethylene glycol diethyl ether or ethylene glycol dibutyl ether; alcohols such as butanol or methoxypropanol; and mixtures of these solvents.

When used as a coating composition, it may contain a variety of conventional additives such as extender pigments, coloring pigments, sag-preventing agents, UV absorbers and the like. After applying onto a substrate as a film, the composition may be cured, depending upon the type of catalyst, by leaving at ambient temperature or baking the film at a temperature between 100° C. and 200° C., preferably between 120° C. and 150° C.

The following examples are intended to illustrate the present invention without limiting thereto. All parts and % therein are by weight unless otherwise specified.

PRODUCTION EXAMPLE 1

To a 4-necked flask charged with 360 parts of xylene was added dropwise a monomer mixture containing a polymerization initiator shown in Table 1 at 110° C. over 3 hours. After the addition, the mixture was allowed to react at 110° C. for 30 minutes. Then 2 parts of KAYAESTER O (t-butylperoxyoctate sold by Nippon Kayaku Co., Ltd.) in 40 parts of xylene were added dropwise at 110° C. over 30 minutes and the mixture allowed to react at the same temperature for additional 90 minutes. An acrylic resin solution having 49.4 % nonvolatiles, a number average molecular weight Mn measured by the GPC method of 5,400, and an activated methylene equivalent weight of 200 was obtained.

PRODUCTION EXAMPLES 2–10

Production Example 1 was followed using a mixture shown in Table 1 and Table 2, respectively. Nonvolatile contents, Mn's and other data are also shown in Table 1 and Table 2.

TABLE 1

| Material, Parts | Production Example | | | | |
|---|---|---|---|---|---|
| | 1 | 2 | 3 | 4 | 5 |
| 2-(ethoxymalonyloxy)-ethyl methacrylate | 244 | 244 | 244 | 244 | 244 |
| n-butyl acrylate | 48 | 129 | 117 | 125 | 129 |
| styrene | 80 | — | — | — | 28 |
| glycidyl methacrylate | 28 | 28 | — | — | — |
| M-100[1] | — | — | 39 | — | — |
| M-GMA[2] | — | — | — | 31 | — |
| KAYAESTER O | 18 | 18 | 18 | 18 | 18 |
| Nonvolatiles, % | 49.4 | 49.4 | 50.0 | 48.7 | 50.5 |
| Mn | 5400 | 5300 | 4300 | 4600 | 5000 |
| Activated methyle E.W.[3] | 200 | 200 | 200 | 200 | 200 |
| Epoxy E.W.[3] | 2004 | 2004 | 2004 | 2004 | — |

[1] 3,4-epoxycyclohexylmethyl methacrylate, Daicel Chemical Industries, Ltd.
[2] β-methylglycidyl methacrylate, Daicel Chemical Industries, Ltd.
[3] Resin solids basis.

TABLE 2

| Material, Parts | Production Example | | | | |
|---|---|---|---|---|---|
| | 6 | 7 | 8 | 9 | 10 |
| 2-(ethoxymalonyloxy)-ethyl methacrylate | 244 | 244 | 244 | 209 | 244 |
| n-butyl methacrylate | 61 | 58 | 61 | 111 | 70 |
| styrene | 80 | 80 | 80 | 80 | 80 |
| glycidyl methacrylate | — | — | 28 | — | — |
| 2-(methacryloyloxy)ethyl trimethylammoniuim chloride | 15 | — | — | — | — |
| 2-(methacryloyloxy)ethyl trimethylammonium bromide | — | 18 | — | — | — |
| methacrylic acid | — | — | — | — | 6 |
| KAYAESTER O | 18 | 18 | 48 | 18 | 18 |
| Nonvolatiles, % | 49.9 | 49.9 | 49.9 | 49.9 | 49.9 |
| Mn | 4300 | 4300 | 2500 | 4200 | 4300 |
| Activated methyle E.W. | 200 | 200 | 200 | 468 | 200 |
| Epoxy E.W. | — | — | 2004 | — | — |

PRODUCTION EXAMPLES 11–15 (FOR COMPARISON)

Production Example 1 was followed using a mixture shown in Table 3, respectively. Nonvolatile contents, Mn's and other data are shown also in Table 3.

TABLE 3

| Material, parts | Production Example | | | | |
|---|---|---|---|---|---|
| | 11 | 12 | 13 | 14 | 15 |
| 2-Acetoacetoxyethyl methacrylate | 214 | 214 | 214 | 214 | 214 |
| n-Butyl methacrylate | 78 | 129 | 129 | 129 | 129 |
| Styrene | 80 | 30 | 30 | 30 | 30 |
| Glycidyl methacrylate | 28 | 28 | — | — | — |
| M-100[1] | — | — | 39 | — | — |
| M-GMA[2] | — | — | — | 31 | — |
| KAYAESTER O | 18 | 18 | 18 | 18 | 18 |
| Nonvolatiles, % | 49.4 | 50.0 | 51.2 | 49.6 | 50.1 |
| Mn | 4,900 | 4,900 | 4,400 | 4,600 | 4,900 |
| Activated methylene E.W.[3] | 200 | 200 | 200 | 200 | 200 |
| Epoxy E.W.[3] | 2,004 | 2,004 | 2,004 | 2,004 | — |

[1] 3,4-epoxycyclohexylmethyl methacrylate, Daicel Chemical Industries, Ltd.
[2] β-methylglycidyl methacrylate, Daicel Chemical Industries, Ltd.
[3] Resin solids basis.

EXAMPLE 1

405 parts of the resin solution of Production Example 1 (200 parts as solids), 50 parts of pentaerythritol triacrylate (PETA), 2 parts of tetrabutylammonium bromide (TBABr), 10 parts of UV absorber (TINUBIN 900 sold by Ciba-Geigy AG) and 5 parts of photostabilizer (SANOL LS-400 sold by Ciba-Geigy AG) were thoroughly mixed to make a solution. The solution was applied on a tinplate using #40 bar coater and heated in an oven at 140° C. for 20 minutes. The resulting cured film was tested for gel fraction and weatherability. The gel fraction was determined based on the difference of weight before and after soaking the film in a 1:1 mixture of acetone and methanol at room temperature for 48 hours. The weatherability of the cured film was evaluated in terms of degree of yellowing when subjecting to five cycles of standard weathering test in a sunshine weatherometer.

The evaluation schedule is as follows.

Very good (GG): No yellowing.

Good (G): Slightly appreciable yellowing.

Fair (F): Appreciable yellowing.

Bad (B): Remarkable yellowing.

The test results are shown in Table 4.

EXAMPLES 2–30

Example 1 was followed, respectively, except that the formulation was changed as shown in Table 4 through Table 9. The results are shown in Table 4 through Table 9.

TABLE 4

| | Example | | | | |
|---|---|---|---|---|---|
| | 1 | 2 | 3 | 4 | 5 |
| Component (a), parts | PETA 50 | PETA 50 | PETA 50 | PTEA 50 | PETA 50 |
| Component (b), parts | Pro. Ex. 1 405 | Pro. Ex. 1 405 | Pro. Ex. 1 405 | Pro. Ex. 1 405 | Pro. Ex. 1 405 |
| Component (c), parts | TBABr 2 | TBANO 2 | TBACl 2 | TBAPA 2 | TBASA 2 |
| Curing condition | 140° C. × 20 min. | 140° C. × 20 min. | 140° C. × 20 min. | 140° C. × 20 min. | 140° C. × 20 min. |
| Gel fraction, % | 99.8 | 98.5 | 97.6 | 98.1 | 98.1 |

TABLE 4-continued

| | Example | | | | |
|---|---|---|---|---|---|
| | 1 | 2 | 3 | 4 | 5 |
| Weather-ability | GG | GG | GG | GG | GG |

PETA: pentaerythritol triacrylate
TBABr: tetrabutylammonium bromide
TBANO: tetrabutylammonium nitrate
TBACl: tetrabutylammonium chloride
TBAPA: tetrabutylammonium phthalate
TBASA: tetrabutylammonium salicylate

TABLE 5

| | Example | | | | |
|---|---|---|---|---|---|
| | 6 | 7 | 8 | 9 | 10 |
| Component (a), | PETA | PETA | PETA | PTEA | PETA |
| parts | 50 | 50 | 50 | 50 | 50 |
| Component (b), | Pro. Ex. 1 | Pro. Ex. 1 | Pro. Ex. 1 | Pro. Ex. 1 | Pro. Ex. 1 |
| parts | 405 | 405 | 405 | 405 | 405 |
| Component (c), | TBABA | TBAP | TBAI | TBAAc | TMBACl |
| parts | 2 | 2 | 2 | 2 | 2 |
| Curing condition | 140° C. × 20 min. | 140° C. × 20 min. | 140° C. × 20 min. | 140° C. × 20 min. | 140° C. × 20 min. |
| Gel fraction, % | 98.4 | 95.2 | 93.5 | 98.8 | 98.1 |
| Weather-ability | GG | GG | GG | GG | GG |

TBABA: tetrabutylammonium benzoate
TBAP: tetrabutylammonium di-t-butylphosphate
TBAI: tetrabutylammonium iodide
TBAAC: tetrabutylammonium acetate
TMBACl: trimethylbenzylammonium chloride

TABLE 6

| | Example | | | | |
|---|---|---|---|---|---|
| | 11 | 12 | 13 | 14 | 15 |
| Component (a), | TMPTA | PETA | PETA | DPCA-120 | UA306H |
| parts | 50 | 50 | 50 | 150 | 50 |
| Component (b), | Pro. Ex. 1 | Pro. Ex. 1 | Pro. Ex. 1 | Pro. Ex. 2 | Pro. Ex. 5 |
| parts | 405 | 405 | 405 | 405 | 396 |
| Component (c), | TBPBr | TMSI | CPBr | TBACl | TBABr |
| parts | 2 | 4 | 4 | 2 | 2 |
| Epoxy compound parts | — | — | — | — | EPIKOTE 825 15 |
| Curing condition | 140° C. × 20 min. | 140° C. × 20 min. | 140° C. × 20 min. | 140° C. × 20 min. | 140° C. × 20 min. |
| Gel fraction, % | 98.4 | 90.2 | 96.5 | 92.8 | 93.1 |
| Weather-ability | GG | G | G | GG | GG |

TMPTA: trimethylolpropane triacrylate
DPCA-120: KAYARAD DPCA-120, dipentaerythritol/caprolactone (1:12) adduct hexacrylate sold by Nippon Kayaku Co., Ltd.
UA 306H: HMDI/pentaerythritol (1:2) adduct sold by Kyoeisha Yushi Kagaku Kogyo K.K.
TBPBr: tetrabutylphosphonium bromide;
TMSI: trimethylsulfonium iodide;
CPBr: cetylpyridiniumbromide;
EPIKOTE 825: bisphenol A diglycidyl ether

TABLE 7

| | Example | | | | |
|---|---|---|---|---|---|
| | 16 | 17 | 18 | 19 | 20 |
| Component (a), | A-400 | 3002A | PETA | PTEA | TMPTGA |
| parts | 200 | 200 | 50 | 50 | 50 |
| Component (b), | Pro. Ex. 3 | Pro. Ex. 4 | Pro. Ex. 5 | Pro. Ex. 5 | Pro. Ex. 5 |
| parts | 400 | 411 | 396 | 396 | 396 |
| Component (c), | TBACl | TBACl | TBAOH | TBAF | NaOMe |
| parts | 2 | 2 | 2 | 2 | 2 |
| Curing condition | 140° C. × 20 min. | 140° C. × 20 min. | 140° C. × 20 min. | 140° C. × 20 min. | 140° C. × 20 min. |
| Gel fraction, % | 93.7 | 94.8 | 96.0 | 94.0 | 90.4 |
| Weather-ability | G | G | GG | GG | G |

A-400: NK ESTER A-400, polyethylene glycol diacrylate sold by Shin-Nakamura Kagaku Kogyo K.K.
3002A: EPOXY ESTER 3002A, reaction product of bisphenol A/propylene oxide (1:2) adduct diglycidyl ether and acrylic acid sold by Kyoeisha Yushi Kagaku Kogyo K.K.
TBAOH: tetrabutylammonium hydroxide;
TBAF: tetrabutylammonium fluoride;
NaOMe: sodium methoxide

TABLE 8

| | 21 | 22 | 23 | 24 | 25 |
|---|---|---|---|---|---|
| Component (a), | PETA | PETA | PETA | PTEA | PETA |
| parts | 50 | 50 | 50 | 50 | 50 |
| Component (b), | Pro. Ex. 1 | Pro. Ex. 1 | Pro. Ex. 1 | Pro. Ex. 1 | Pro. Ex. 1 |
| parts | 405 | 405 | 405 | 405 | 405 |
| Component (c), | Pro. Ex. 6 | TBABH4 | QDMC | TMOBr | GTAC |
| parts | 50 | 2 | 2 | 2 | 2 |
| Curing condition | 140° C. × 20 min. | 140° C. × 20 min. | 140° C. × 20 min. | 140° C. × 20 min. | 140° C. × 20 min. |
| Gel fraction, % | 98.9 | 99.2 | 97.5 | 98 | 97.1 |
| Weather-ability | GG | GG | GG | GG | GG |

TBABH4: tetrabutylammonium tetrahydroborate
QDMC: 2-(methacryloyloxy)ethyltrimethylammonium chloride
TMOBr: trimethyloctylammonium bromide
GTAC: glycidyltrimethylammonium chloride

TABLE 9

| | Example | | | | |
|---|---|---|---|---|---|
| | 26 | 27 | 28 | 29 | 30 |
| Component (a), | PETA | PETA | PETA | PTEA | PETA |
| parts | 50 | 50 | 50 | 50 | 50 |
| Component (b), | Pro. Ex. 1 | Pro. Ex. 8 | Pro. Ex. 9 | Pro. Ex. 10 | Pro. Ex. 10 |
| parts | 405 | 405 | 405 | 405 | 405 |
| Component (c), | Pro. Ex. 7 | TBABr | TBABr | TBAOH | TMBOH |
| parts | 50 | 2 | 2 | 2 | 2 |
| Curing condition | 140° C. × 20 min. | 140° C. × 20 min. | 140° C. × 20 min. | 140° C. × 20 min. | 140° C. × 20 min. |
| Gel fraction, % | 98.2 | 99.2 | 97.2 | 98 | 97.1 |

TABLE 9-continued

| | Example | | | | |
|---|---|---|---|---|---|
| | 26 | 27 | 28 | 29 | 30 |
| Wetherability | GG | GG | GG | GG | GG |

TMBOH: trimethylbenzylammonium hydroxide

COMPARATIVE EXAMPLES 1–20

Example 1 was followed, respectively, except that the formulation was changed as shown in Table 10 through Table 13. These Comparative Examples correspond to Examples 1–20. The results are shown in Table 10 through Table 13.

TABLE 10

| | Comparative Example | | | | |
|---|---|---|---|---|---|
| | 1 | 2 | 3 | 4 | 5 |
| Component (a), parts | PETA 50 | PETA 50 | PETA 50 | PTEA 50 | PETA 50 |
| Component (b), parts | Pro. Ex. 11 405 | Pro. Ex. 11 405 | Pro. Ex. 11 405 | Pro. Ex. 11 405 | Pro. Ex. 11 405 |
| Component (c), parts | TBABr 2 | TBANO 2 | TBACl 2 | TBAPA 2 | TBASA 2 |
| Curing condition | 140° C. × 20 min. | 140° C. × 20 min. | 140° C. × 20 min. | 140° C. × 20 min. | 140° C. × 20 min. |
| Gel fraction, % | 98.8 | 97.8 | 98.6 | 98.0 | 96.9 |
| Weatherability | B | B | B | B | B |

TABLE 11

| | Comparative Example | | | | |
|---|---|---|---|---|---|
| | 6 | 7 | 8 | 9 | 10 |
| Component (a), parts | PETA 50 | PETA 50 | PETA 50 | PTEA 50 | PETA 50 |
| Component (b), parts | Pro. Ex. 11 405 | Pro. Ex. 11 405 | Pro. Ex. 11 405 | Pro. Ex. 11 405 | Pro. Ex. 11 405 |
| Component (c), parts | TBABA 2 | TBAP 2 | TBAI 2 | TBAAc 2 | TMBACl 2 |
| Curing condition | 140° C. × 20 min. | 160° C. × 20 min. | 160° C. × 20 min. | 140° C. × 20 min. | 140° C. × 20 min. |
| Gel fraction, % | 98.8 | 97.8 | 98.6 | 98.0 | 96.9 |
| Weatherability | B | B | B | B | B |

TABLE 12

| | Comparative Example | | | | |
|---|---|---|---|---|---|
| | 11 | 12 | 13 | 14 | 15 |
| Component (a), parts | TMPTA 50 | PETA 50 | PETA 50 | DPCA-120 150 | UA306H 50 |
| Component (b), parts | Pro. Ex. 11 405 | Pro. Ex. 11 405 | Pro. Ex. 11 405 | Pro. Ex. 12 400 | Pro. Ex. 15 399 |
| Component (c), parts | TBPBr 2 | TMSI 4 | CPBr 4 | TBACl 2 | TBABr 2 |
| Epoxy compound parts | — | — | — | — | EPIKOTE 825 15 |
| Curing condition | 140° C. × 20 min. | 160° C. × 20 min. | 160° C. × 20 min. | 140° C. × 20 min. | 140° C. × 20 min. |
| Gel fraction, % | 98.7 | 88.8 | 86.9 | 93.8 | 95.4 |
| Weatherability | B | B | B | B | B |

TABLE 13

| | Comparative Example | | | | |
|---|---|---|---|---|---|
| | 16 | 17 | 18 | 19 | 20 |
| Component (a), parts | A-400 200 | 3002A 200 | PETA 50 | PTEA 50 | TMPTA 50 |
| Component (b), parts | Pro. Ex. 13 391 | Pro. Ex. 14 403 | Pro. Ex. 15 399 | Pro. Ex. 15 399 | Pro. Ex. 15 399 |
| Component (c), parts | TBACl 2 | TBACl 2 | TBAOH 2 | TBAF 2 | NaOMe 2 |
| Curing condition | 140° C. × 20 min. | 140° C. × 20 min. | 140° C. × 20 min. | 140° C. × 20 min. | 140° C. × 20 min. |
| Gel fraction, % | 94.5 | 93.3 | 96.6 | 95.8 | 92.5 |
| Weatherability | B | B | B | B | B |

EXAMPLE 31

A zinc phosphate-treated steel plate of 0.8 mm thickness was coated with a cathodic electrodeposition paint (POWER TOP PU-50, Nippon Paint Co., Ltd.) electrically to a dry film thickness of about 25 μm, then with a midlayer paint (ORGA P-2 sealer, Nippon Paint Co., Ltd.) by air spraying to a dry film thickness of about 40 μm. Then, both paint films were baked at 140° C. for 30 minutes.

In the next step, a base coat composition having the following formulation was air sprayed to a dry film thickness of about 16 μm and allowed to set for about 7 minutes.

| Base coat composition | |
|---|---|
| Material | Parts |
| ALUPASTE 7160N (aluminum flake paste sold by Toyo Aluminum Co., Ltd., flake contrent 65%) | 10 |
| Acrylic varnish (80% nonvolatiles, OH #100, acid #80, Mn 1,800) | 50 |
| CYMEL 202 (melamine resin sold by Mitsui Cytec Co., Ltd., 80% nonvolatiles) | 10 |
| CYMEL 327 (melamine resin sold by Mitsui Cytec Co., Ltd., 90% nonvolatiles) | 10 |
| Isopropyl alcohol | 7 |

Then, the solution of Example 1 adjusted to Ford cup #4 viscosity of 30 seconds was applied electrostatically onto the base coat film wet-on-wet, and baked both films simultaneously at 140° C. for 25 minutes.

COMPARATIVE EXAMPLE 21

Example 31 was followed except that the solution of Example 1 was replaced with the solution of Comparative Example 1.

Wetherability Evaluation

Cured multilayer coats of Example 31 and Comparative Example 21 were subjected to the wetherability test as in Example 1. The degree of yellowing was not observed with the multilayer coat of Example 31 while the multilayer coat of Comparative Example 21 was remarkably yellowed.

We claim:

1. A curable resin composition comprising:
   (a) a component containing a plurality of α,β-ethylenically unsaturated carbonyl groups in the molecule;
   (b) a copolymer of a malonate monomer of the formula

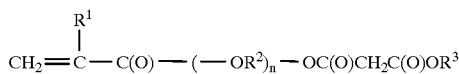

wherein $R^1$ is hydrogen or methyl, $R^2$ is a $C_2$–$C_6$ alkylene, $R^3$ is a $C_1$–$C_6$ alkyl and n is a integer from 1 to 10, and an ethylenically unsaturated monomer copolymerizable therewith; and
   (c) a catalyst capable of promoting the Michael reaction between said components (a) and (b).

2. The composition of claim 1, wherein said component (a) is a polyol poly(meth)acrylate, an unsaturated polyester resin, a polyester acrylate resin, an epoxy acrylate resin, a urethane acrylate resin, an α,β-unsaturated carbonyl group-containing acrylic resin, a polyether acrylate resin, a silicone oligomer having (meth) acryloyl groups, or an α,β-unsaturated carbonyl group-containing fluororesin.

3. The composition of claim 1, wherein said malonate monomer is an asymmetric malonate ester in which one of the carboxyl groups is esterified with an alkanol while the other carboxyl group is esterified with a hydroxyalkyl(meth)acrylate.

4. The composition of claim 1, wherein said malonate monomer is an asymmetric malonate ester in which one of the carboxyl groups is esterified with an alkanol while the other carboxyl group is esterified with a polyoxyalkylene glycol mono(meth)acrylate.

5. The composition of claim 1, wherein said catalyst (c) is a strong base or a quaternary ammonium fluoride or tetrahydroborate.

6. The composition of claim 5, wherein said strong base is an alkali metal hydroxide, an alkali metal alkoxide, a quaternary ammonium hydroxide, a tertiary amine, a guanidine, an amidine, a tertiary phosphine, or a mixture thereof.

7. The composition of claim 1, wherein said catalyst (c) is a combination of an onium salt with an epoxy compound independently added to the composition or covalently attached to said component (a) or said component (b), said onium salt itself having no catalytic activity on the Michael reaction.

8. The composition of claim 1, wherein the onium cation of said onium salt is a tetraalkylammonium, trialkylaralkylammonium, alkylpyridinium, tetraalkylphosphonium or trialkylsulfonium and the counter anion is chloride, bromide, iodide, salicylate, monobasic carboxylate, polybasic carboxylate, nitrate, sulfonate, sulfate, acid sulfate ester, sulfite, phosphate or acid phosphate ester anion.

9. The composition of claim 7, wherein said epoxy compound is a glycidyl ether, a glycidyl ester, an alicyclic epoxide or an α-olefine epoxide added to the composition as a discrete component.

10. The composition of claim 7, wherein said epoxy compound is an epoxy function remaining in said component (a), or glycidyl (meth)acrylate, β-methylglycidyl (meth) acrylate or 3,4-epoxycyclohexylmethyl (meth) acrylate copolymerized with the monomers of said acrylate polymer (a).

11. The composition of claim 7, wherein said onium salt is a reactive quaternary ammonium salt having a functional group capable of covelently linking to said component (a) or said component (b).

12. The composition of claim 11, wherein said reactive quaternary ammonium salt is a glycidyl ammonium salt independently added to the composition or linked to said component (a) or said component (b) through the reaction with a free carboxyl group thereof.

13. The composition of claim 11, wherein said reactive quaternary ammonium salt is an ammonium salt having (meth) acryloyl group independently added to the composition or copolymerized in said component (a) or said component (b).

14. A coating composition comprising the curable resin composition of claim 1 as a vehicle component thereof.

15. A coating composition comprising the curable resin composition of claim 11 as a vehicle component thereof.

* * * * *